May 30, 1944.  W. SCHADE  2,350,133
WIDE ANGLE LENSES
Filed July 7, 1942  2 Sheets-Sheet 1

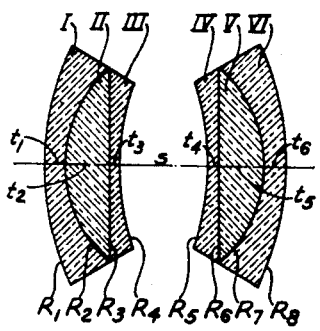

| EXAMPLE: 1 | | f/6.3 | | f = 100 mm. |
|---|---|---|---|---|
| LENS | $N_D$ | V | RADII | THICKNESSES |
| I | 1.745 | 45.8 | $R_1 = +\ 27.20$ mm. | $t_1 =\ 2.23$ mm. |
| II | 1.697 | 56.1 | $R_2 = +\ 12.60$ mm. | $t_2 =\ 4.55$ mm. |
| III | 1.500 | 61.8 | $R_3\ \infty$ | $t_3 =\ 1.12$ mm. |
| | | | $R_4 = +\ 24.71$ mm. | $s =\ 8.92$ mm. |
| IV | 1.500 | 61.8 | $R_5 = -\ 24.71$ mm. | $t_4 =\ 1.12$ mm. |
| V | 1.697 | 56.1 | $R_6\ \infty$ | $t_5 =\ 4.55$ mm. |
| VI | 1.745 | 45.8 | $R_7 = -\ 12.60$ mm. | $t_6 =\ 2.23$ mm. |
| | | | $R_8 = -\ 27.20$ mm. | $T = 24.72$ mm. |

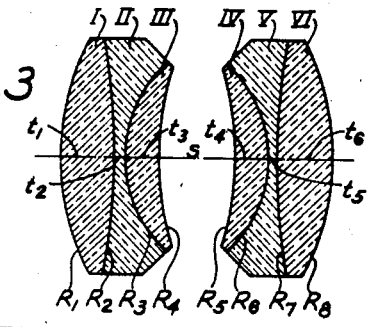

| EXAMPLE: 2 | | f/5.6 | | f = 100 mm. |
|---|---|---|---|---|
| LENS | $N_D$ | V | RADII | THICKNESSES |
| I | 1.898 | 40.0 | $R_1 = +\ 25.00$ mm. | $t_1 =\ 5.5$ mm. |
| II | 1.800 | 38.0 | $R_2 = -\ 72.00$ mm. | $t_2 =\ 1.0$ mm. |
| III | 1.565 | 51.0 | $R_3 = +\ 13.07$ mm. | $t_3 =\ 3.3$ mm. |
| | | | $R_4 = +\ 30.88$ mm. | $S =\ 7.5$ mm. |
| IV | 1.565 | 51.0 | $R_5 = -\ 30.88$ mm. | $t_4 =\ 3.3$ mm. |
| V | 1.800 | 38.0 | $R_6 = -\ 13.07$ mm. | $t_5 =\ 1.0$ mm. |
| VI | 1.898 | 40.0 | $R_7 = +\ 72.00$ mm. | $t_6 =\ 5.5$ mm. |
| | | | $R_8 = -\ 25.00$ mm. | $T = 27.1$ mm. |

WILLY SCHADE
INVENTOR

BY
ATTY & AG'T.

| EXAMPLE: 3 | | | f/5.6 | f = 100mm. |
|---|---|---|---|---|
| LENS | $N_D$ | V | RADII | THICKNESSES |
| I | 1.745 | 45.8 | $R_1 = +\ 31.42$ mm. | $t_1 = 2.52$ mm. |
| II | 1.697 | 56.1 | $R_2 = +\ 14.13$ mm. | $t_2 = 6.62$ mm. |
| III | 1.500 | 61.8 | $R_3 = -428.90$ mm. | $t_3 = 1.16$ mm. |
| | | | $R_4 = +\ 28.28$ mm. | $s = 10.51$ mm. |
| IV | 1.500 | 61.8 | $R_5 = -\ 25.60$ mm. | $t_4 = 1.16$ mm. |
| V | 1.697 | 56.1 | $R_6 = -542.36$ mm. | $t_5 = 5.55$ mm. |
| VI | 1.745 | 45.8 | $R_7 = -\ 12.71$ mm. | $t_6 = 1.37$ mm. |
| | | | $R_8 = -\ 26.97$ mm. | $T = 28.89$ mm. |

WILLY SCHADE
INVENTOR

Patented May 30, 1944

2,350,133

UNITED STATES PATENT OFFICE 2,350,133

WIDE ANGLE LENS

Willy Schade, Rochester, N. Y., assignor to Eastman Kodak Company, Rochester, N. Y., a corporation of New Jersey Application July 7, 1942, Serial No. 450,007

11 Claims. (Cl. 88—57)

This invention relates to lenses and particularly to photographic objectives, of the type known as doublet anastigmat.

The principal object of the invention is to provide a lens of this type covering a greater angle of field and capable of being used at a larger aperture than heretofore.

An ancillary object of the invention is to provide an objective with superior correction of zonal aberrations, particularly spherical aberration both axial and oblique, and astigmatism.

Objectives of this type have two positive components meniscus in outward form and concave toward a diaphragm enclosed therebetween. Preferably each component consists of three elements cemented together, two being of like sign and enclosing the third which is of the opposite sign, of which elements the one nearest the diaphragm has the lowest refractive index while the one farthest from the diaphragm has the highest index. The two components are sometimes exactly symmetrical one with the other, and sometimes more or less unsymmetrical when exceptionally good coma correction is required.

Objectives of this type are comparatively short relative to their diameter and consequently are useful in covering a large field with but little decrease of illumination near the edge.

According to the present invention objectives of this type are improved by making the index of the outer elements greater than 1.68 and greater by at least 0.18 than the lowest refractive index, and by using glass with dispersive index greater than 35 (even lower values of dispersive index are not too detrimental however). If the intermediate index is chosen midway between the other two it gives rise to a rather bad zonal curvature of field. This index accordingly should be closer to one than to the other of the extreme indices, preferably closer to the highest index, so that it differs from one by at least one and one-half times as much as it differs from the other.

The stronger of the two cemented surfaces is made concave toward the diaphragm in the usual manner while the weaker one may be convex toward the diaphragm, as is usual, or plano or even concave toward the diaphragm, but is made with an unusually long radius of curvature. A plano surface is here considered as the limiting case of a spherical surface with infinitely long radius of curvature.

In a preferred form of the invention this radius is longer than the focal length of the double objective, and in any case it is longer than one-half this focal length. It is preferred that this radius be longer when the two glass-air surfaces are more nearly equal in curvature according to the relationship $$\frac{f}{R_w} < 1 + \frac{400}{f^2}(R_1 - R_4)^2$$

where $R_w$ is the radius of curvature of the weaker cemented surface, $f$ is the equivalent focal length of the double objective, and $R_1$ and $R_4$ are the respective radii of curvature of the two glass-air surfaces, using the absolute value of each. This particular formula is empirically derived and hence is not absolutely critical.

It is preferred that the airspace be between $0.06f$ and $0.15f$. This is more advantageous in reducing the zonal field than a shorter airspace, while a longer airspace results in an undesirable reduction of the oblique illumination unless the lenses are made excessively large in diameter.

This class of objective includes two subclasses: in one a positive element is cemented between two negative elements, and in the other a negative element is between two positive elements to form the half lens.

In the latter case the convex glass-air surface has a shorter radius of curvature than the concave one. It is preferred that this difference should exceed $0.03f$.

In the other case, on the contrary, the concave surface has the shorter radius of curvature of the two. In this type of lens the weaker cemented surface tends to be less convex or more concave toward the diaphragm. It is preferred that its radius of curvature be greater than the focal length of the double objective.

All of these features are advantageous in securing an exceptionally fine correction of the zonal aberrations permitting the use of an aperture of $f/6.3$ or greater and having a useful field extending about 35° from the axis.

In the accompanying drawings:

Fig. 1 shows a symmetrical double objective with a positive inner element in each cemented triplet.

Fig. 2 shows constructional data for Fig. 1,

Fig. 3 shows a symmetrical double objective with a negative inner element in each cemented triplet, Fig. 4 shows construction data for Fig. 3.

Figures 5, 6:
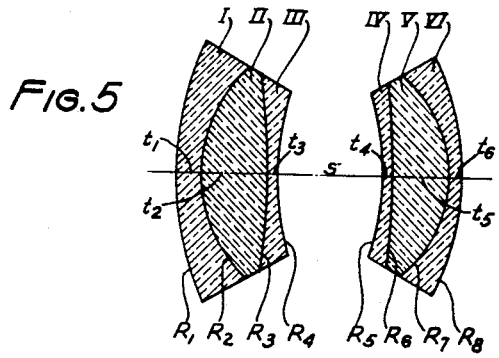
Fig. 5 shows double objective similar to Fig. 1 but unsymmetrical.
Fig. 6 shows the constructional data for Fig. 5.

Constructional data of Figs. 2, 4, and 6 are as follows:

*Example 1*

$f=100$ mm.  $f/6.3$

| Lens | $N_D$ | V | Radii | Thicknesses |
|---|---|---|---|---|
| I | 1.745 | 45.8 | $R_1=+27.20$ mm. | $t_1=2.23$ mm. |
| II | 1.697 | 56.1 | $R_2=+12.60$ | $t_2=4.55$ |
| III | 1.500 | 61.8 | $R_3=\infty$ | $t_3=1.12$ |
|  |  |  | $R_4=+24.71$ | $S=8.92$ |
| IV | 1.500 | 61.8 | $R_5=-24.71$ | $t_4=1.12$ |
| V | 1.697 | 56.1 | $R_6=\infty$ | $t_5=4.55$ |
| VI | 1.745 | 45.8 | $R_7=-12.60$ | $t_6=2.23$ |
|  |  |  | $R_8=-27.20$ |  |

*Example 2*

$f=100$ mm.  $f/5.6$

| Lens | $N_D$ | V | Radii | Thicknesses |
|---|---|---|---|---|
| I | 1.898 | 40 | $R_1=+25.00$ mm. | $t_1=5.5$ mm. |
| II | 1.800 | 38 | $R_2=-72.00$ | $t_2=1.0$ |
| III | 1.565 | 51 | $R_3=+13.07$ | $t_3=3.3$ |
|  |  |  | $R_4=+30.88$ | $S=7.5$ |
| IV | 1.565 | 51 | $R_5=-30.88$ | $t_4=3.3$ |
| V | 1.800 | 38 | $R_6=-13.07$ | $t_5=1.0$ |
| VI | 1.898 | 40 | $R_7=+72.00$ | $t_6=5.5$ |
|  |  |  | $R_8=-25.00$ |  |

*Example 3*

$f=100$ mm.  $f/6.3$

| Lens | $N_D$ | V | Radii | Thicknesses |
|---|---|---|---|---|
| I | 1.745 | 45.8 | $R_1=+31.42$ mm. | $t_1=2.52$ mm. |
| II | 1.697 | 56.1 | $R_2=+14.13$ | $t_2=6.62$ |
| III | 1.500 | 61.8 | $R_3=-428.90$ | $t_3=1.16$ |
|  |  |  | $R_4=+28.28$ | $S=10.51$ |
| IV | 1.500 | 61.8 | $R_5=-25.60$ | $t_4=1.16$ |
| V | 1.697 | 56.1 | $R_6=-542.36$ | $t_5=5.55$ |
| VI | 1.745 | 45.8 | $R_7=-12.71$ | $t_6=1.37$ |
|  |  |  | $R_8=-26.97$ |  |

In these tables a plus sign indicates that the surface is convex to the incident light, while a minus sign indicates that it is concave thereto.

In the embodiment shown in Figs. 1 and 2 each component consists of a positive element cemented between two negative elements of which the one nearest the diaphragm has the lowest refractive index, 1.50, while the one farthest from the diaphragm has the highest index, 1.745, differing from the other negative element by 0.245, and the positive element has an index of 1.697, differing from the other two by 0.197 and 0.048 respectively. The stronger cemented surface is farther from the diaphragm and is concave toward the diaphragm while the other cemented surface is plano, that is, its radius of curvature is infinite. The central space is .0892$f$. The more strongly curved glass-air surface is the concave one, as is preferred when it bounds a negative element.

In the embodiment shown in Figs. 3 and 4 each component consists of a negative element cemented between two positive elements. The index of the element nearest the diaphragm is 1.565, while that of the element farthest from the diaphragm is 1.898 which exceeds the other index by 0.333. The index of the negative element is 1.800, which exceeds the first mentioned index by 0.235 but is 0.098 less than the other index, so that more than 70% of the total index difference occurs at the weaker cemented surface. In this case the stronger cemented surface is the one nearer the diaphragm and is concave thereto while the weaker cemented surface is convex toward the diaphragm but has a radius of curvature of 0.72$f$, which is greater than 0.5$f$.

The glass-air surfaces have radii of curvature which differ by 5.88 mm. which is greater than 0.03$f$, the concave one being more weakly curved. It will be noted that:

$$1+\frac{400}{f^2}(5.88)^2=2.38$$

The ratio $f/R_w=100/72=1.39$ is smaller than this number, where $R_w$ is the radius of curvature of the weaker cemented surface.

The airspace in this case is 0.075$f$.

Example 3, Figs. 5 and 6, is similar to Example 1, except that an exceptionally fine correction of coma has been obtained by making the objective somewhat unsymmetrical.

In the front half the weaker cemented surface is convex to the diaphragm while in the rear half it is concave thereto, but in each half the radius of curvature is greater than the focal length of the objective according to the most preferred embodiment of the invention. The concave glass-air surface is the more strongly curved, as was pointed out to be the case in Example 1. The central airspace is 0.105$f$.

Having thus explained and illustrated my invention I wish to point out that it is not limited to the examples shown but may be greatly varied in details in the manner well known to those skilled in the art without departing from the spirit thereof.

What I claim is:

1. A photographic objective of the type consisting of two positive components meniscus in outward form and concave toward a diaphragm enclosed therebetween and each consisting of three elements cemented together with the more highly curved of the two cemented surfaces concave toward the diaphragm, two of said elements being of like sign and enclosing the third which is of the opposite sign, of which elements the one nearest the diaphragm has the lowest refractive index while the one farthest from the diaphragm has the highest index, characterized by the weaker cemented surface in each component having a radius of curvature whose absolute value is greater than one-half the focal length of the objective and by the element farthest from the diaphragm being made of a glass of which the refractive index is greater than 1.68 while the dispersive index is greater than 35.

2. An objective according to claim 1 further characterized in that the highest refractive index in each component exceeds the lowest by at least 0.18, while one of these two differs from the intermediate index at least one and one-half times as much as does the other.

3. An objective according to claim 1 further characterized in that the highest refractive index exceeds the lowest by at least 0.18, while the intermediate index exceeds the lowest by at least six-tenths of the difference between the highest and the lowest.

4. A photographic objective as claimed in claim 1 further characterized by the airspace between the two components being between 0.06$f$ and 0.15$f$ where $f$ is the focal length of the double objective.

5. An objective according to claim 1 further characterized by the product of the curvature of the weaker cemented surface in each component times the focal length of the double objective being less than $$1 + 400\left(\frac{R_1 - R_4}{f}\right)^2$$

where $R_1$ and $R_4$ are the respective radii of curvature of the two glass-air surfaces of the component and $f$ is the focal length of the double objective.

6. A photographic objective of the type consisting of two positive components meniscus in shape and concave toward a diaphragm therebetween and each component consisting of a positive element cemented between two negative elements of which the element most remote from the diaphragm has the highest refractive index while the one nearest the diaphragm has the lowest index and the cemented surface farther from the diaphragm is the more strongly curved and is concave toward the diaphragm, characterized by the element farthest from the diaphragm being made of glass with refractive index greater than 1.68 and dispersive index greater than 35 and by the absolute value of the radius of curvature of the cemented surface nearer the diaphragm being greater than the focal length of the double objective.

7. An objective as described in claim 6 in which the difference between the intermediate index and the lowest index is greater than six-tenths of the difference between the highest and the lowest index, while the latter difference is greater than 0.18.

8. A photographic objective of the type consisting of two positive components meniscus in shape and concave toward a diaphragm therebetween and each component consisting of a negative element cemented between two positive elements, of which the element nearest the diaphragm has the lowest refractive index while the farthest one has the highest index and the cemented surface nearer the diaphragm is the more strongly curved and is concave toward the diaphragm, characterized by the element farthest from the diaphragm being made of glass with refractive index greater than 1.68 and dispersive index greater than 35, by the absolute value of the radius of curvature of the cemented surface farther from the diaphragm being greater than one-half the focal length of the double objective, and by the radius of curvature of the concave glass-air surface exceeding that of the convex one by at least three one-hundredths of the focal length of the objective.

9. An objective as described in claim 8 in which the airspace between the two components is between 0.06 and 0.15 times the focal length of the objective.

10. A photographic objective consisting of two components each of which consists of three elements cemented together and having substantially the following specifications:

| Lens | $N_D$ | V | Radii | Thicknesses |
|---|---|---|---|---|
| I | 1.74 | 46 | $R_1 = +.27f$ | $t_1 = .02f$ |
| II | 1.70 | 56 | $R_2 = +.13f$ | $t_2 = .05f$ |
| III | 1.50 | 62 | $R_3 = \infty$ | $t_3 = .01f$ |
|  |  |  | $R_4 = +.25f$ | $S = .09f$ |
| IV | 1.50 | 62 | $R_5 = -.25f$ | $t_4 = .01f$ |
| V | 1.70 | 56 | $R_6 = \infty$ | $t_5 = .05f$ |
| VI | 1.74 | 46 | $R_7 = -.13f$ | $t_6 = .02f$ |
|  |  |  | $R_8 = -.27f$ |  | where the first column gives the lens elements in Roman numerals in order from front to rear and indicates airspaces by dashes and where $f$ is the focal length of the objective, $N_D$ is the index of refraction for the D line of the solar spectrum, V is the dispersive index, R and $t$ refer respectively to the radii of curvature of the refractive surfaces, and the thicknesses of the elements, the subscripts on these refer respectively to the surfaces and to the elements numbered consecutively from the front, S refers to the airspace between the two components, and the + and − signs in the fourth column correspond to surfaces which are respectively convex and concave to the front.

11. A photographic objective of the type consisting of two positive components meniscus in outward form and concave toward a diaphragm enclosed therebetween and each consisting of three elements cemented together with the more highly curved of the two cemented surfaces concave toward the diaphragm, two of said elements being of like sign and enclosing the third which is of the opposite sign, of which elements the one nearest the diaphragm has the lowest refractive index while the one farthest from the diaphragm has the highest index, characterized by the weaker cemented surface in each component having a radius of curvature whose absolute value is greater than the focal length of the objective and by the element farthest from the diaphragm being made of a glass of which the refractive index is greater than 1.68 while the dispersive index is greater than 35.

WILLY SCHADE.